United States Patent [19]
Nogossek

[11] Patent Number: 5,255,973
[45] Date of Patent: Oct. 26, 1993

[54] PLASTIFIER WITH THROTTLE MEANS

[75] Inventor: Alfred Nogossek, Salzgitter, Fed. Rep. of Germany

[73] Assignee: Friedrich Theysohn GmbH, Langenhagen, Fed. Rep. of Germany

[21] Appl. No.: 898,902

[22] Filed: Jun. 11, 1992

[30] Foreign Application Priority Data

Jun. 11, 1991 [DE] Fed. Rep. of Germany ....... 4119145

[51] Int. Cl.[5] .............................................. B29B 7/72
[52] U.S. Cl. ..................... 366/85; 366/301; 425/204; 425/382.4
[58] Field of Search ................. 366/75, 79, 80, 82–85, 366/145, 301; 425/204, 208, 209, 202, 154, 382.4, 205

[56] References Cited

U.S. PATENT DOCUMENTS

| | | | |
|---|---|---|---|
| 3,169,752 | 2/1965 | DeLaubarede | 366/80 |
| 3,475,787 | 11/1969 | Heston | 425/202 |
| 3,815,637 | 6/1974 | Carrow | 425/382.4 |
| 4,136,968 | 1/1979 | Todd | 425/204 |
| 4,299,499 | 11/1981 | Buchheit | 366/85 |
| 4,302,172 | 11/1981 | Hogseth et al. | 425/154 |
| 4,332,481 | 6/1982 | Inoue et al. | 366/84 |
| 4,940,329 | 7/1990 | Dienst | 425/208 |

FOREIGN PATENT DOCUMENTS

| | | |
|---|---|---|
| 3407789 | 10/1984 | Fed. Rep. of Germany . |
| 3841729 | 3/1990 | Fed. Rep. of Germany . |
| 2048092 | 12/1980 | United Kingdom . |

*Primary Examiner*—Jay H. Woo
*Assistant Examiner*—Joseph Leyson
*Attorney, Agent, or Firm*—Herbert Dubno; Yuri Kateshov

[57] ABSTRACT

A plastifier extruder of the double-screw type has a slide plate shiftable toward and away from the screws at an acute angle to the axes thereof in a chamber having a trapezoidal axial cross section between extreme positions in which a surface of the plate parallel to the axes lies along one long side of the trapezoid and another limiting position in which the surface lies along the other long side of the trapezoid.

11 Claims, 2 Drawing Sheets

PLASTIFIER WITH THROTTLE MEANS

CROSS REFERENCE TO RELATED APPLICATION

This application is related to my copending application Ser. No. 07/893,516 filed Jun. 3, 1992 based upon German application P 41 18 091.7 of Jun. 3, 1991.

FIELD OF THE INVENTION

My present invention relates to a plastifier for plastic materials and, more particularly, to a worm or screw-type plastifier for converting particulate or scrap thermoplastic material into an extrudable melt by plastification, i.e. a combined kneading and masticating and mixing operation. More specifically, the invention relates to an apparatus for plastifying synthetic resin materials which comprises two meshing worms or screws rotatable about respective axes in an elongated worm or screw housing and which is provided along the screws with at least one throttle location enabling stepless variation of flow cross section in the worm or screw housing (see "PLASTVERARBEITER" 41, Year 1990, Nr. 10, Page 140).

BACKGROUND OF THE INVENTION

As will be apparent from this publication, plastifying apparatus of this type may also be known as a double-worm extruder, a double-screw extruder, a compounding apparatus or unit and by terms of similar import. In the following discussion, I may refer to such a unit simply as an extruder.

An apparatus of this type is equipped with two worms or screws which can be driven in the same sense or in opposite senses and which can have interfitting flights or ribs, i.e. the screws can be provided adjacent one another so that they effectively interfit or mesh.

Along the path of the material to be thermoplastified along the screws and in the chambers of the housing receiving the screws, throttle locations can be provided at which a steplessly variable change in the cross section can be provided.

This change in the cross section varies the flow velocity of the material through the apparatus and, to optimize the plastification, can be modified to suit the particular material. The adjustment of the throttle can also be simply matched to the rheological conditions to the material which is processed, especially the flow characteristics and viscosities thereof. Adjustment at the throttles can allow the residence time of the material in the apparatus and the degree of filling of the material in the apparatus to be varied and thereby enable adjustment of the degree of plastification of the material.

The publication cited describes two extruders with different constructions of the throttle. One version provides a radial throttle in which slide plates can be introduced in a radial direction into the screw housing to a greater or lesser depth. Such slide plates produce dead zones in the flow of the melt which remain in the product downstream of the plates, can form residues which constitute contaminants thereof and can lead to defects in the product.

In an axial throttle version, a radial narrowing of the throttle gap is effected by axial shifting of the screw. This also varies the length of the throttle region. Because of the relatively complex shape of the screw housing and the screw and the need for axial shifting of the screw, the apparatus is inordinately expensive and more difficult to maintain.

OBJECTS OF THE INVENTION

It is, therefore, an object of the invention to provide an improved plastifying apparatus for synthetic resins which will enable effective control of the flow cross section at a throttle region without the formation of dead zones and the drawbacks thereof.

Another object of the invention is to provide an improved extruder-type plastifying apparatus whereby the disadvantages of earlier systems are avoided.

SUMMARY OF THE INVENTION

These objects and others which will become apparent hereinafter are attained, in accordance with the invention, in an extruder-type plastifier which comprises:
   an elongated extruder housing;
   a pair of meshing extruder screws rotatable in the housing in respective generally cylindrical screw-receiving chambers formed therein to advance plastic material to be plastified in a path along the screws through the housing; and
   means forming a steplessly variable throttle for the plastic material along the path, the means forming the throttle including:
      at least one slide plate guided in respective openings on the housing for movement in a direction inclined at an acute angle to axes of the screws and toward and away from the screws,
      the slide plate having a surface turned toward the screws and generally parallel to the axes, and
      a respective compartment formed in the housing at the throttle and bounded by the opening, the compartment widening toward the screws and having a trapezoidal axial cross section with mutually parallel long sides respectively turned toward the screws and communicating with the opening,
      the slide plates having a displacement between extreme positions equal substantially to a distance between the long sides of the respective trapezoidal cross section whereby the respective surface is displaceable between the sides of the respective chamber.

According to the invention, therefore, the plastifier is characterized by a combination of the following features:

(a) The slider plates are inclined to the axes of the screws at an acute angle and are shiftable in the inclined direction;

(b) The surface or edge of each slider plate turned toward the worm is parallel to the axis of the worms or screws;

(c) The space around the screws in the region of the throttle is in the form of a trapezoidal radial enlargement or chamber whose long parallel sides respectively are turned toward screws and communicate with or form a transition with the openings in which the respective slider plates can be guided; and (d) The slider plates have a stroke or displacement equal to the distance between these long parallel sides and the edge or surface terminates at one or the other of the parallel sides in the extreme end position of the sliders.

The trapezoidal configuration of the widening chamber or enlargement means that the leading and trailing flanks of the chamber, with respect to the direction of flow of the material, have opposite inclinations toward the exterior. As a result, there are no projections or undercuts in which the melt can collect. Rather, at the ends of the chamber or enlargement, the transition of the melt flow between surfaces remains free from cavitation or dead zones.

This advantage remains even as the sliders or slide plates are urged inwardly to reduce the flow cross section. The edges of the slider or slide plate extending into the enlargement in the inner positions do not interfere with passage of the melt around the slider so that here again no dead zones or cavitation can be created.

According to a feature of the invention, in the throttle region and juxtaposed with the edge or surface of the sliders are a plurality of throttle disks formed on each of the screws and having recesses angularly equispaced about their respective peripheries, advantageously in a sawtooth configuration and oriented in axial plane or inclined to the axial planes.

The throttle plates or disks can be provided in pairs with gaps between them.

According to another feature of the invention, the chambers or enlargements have, in axial section, the shape of isosceles trapezoids.

The acute angle at which the plate is displaceable relative to the screws can open opposite the direction of flow of the melt through the housing. Alternatively, it can open in the transport direction.

According to another feature of the invention, this acute angle is between 30° and 80°.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
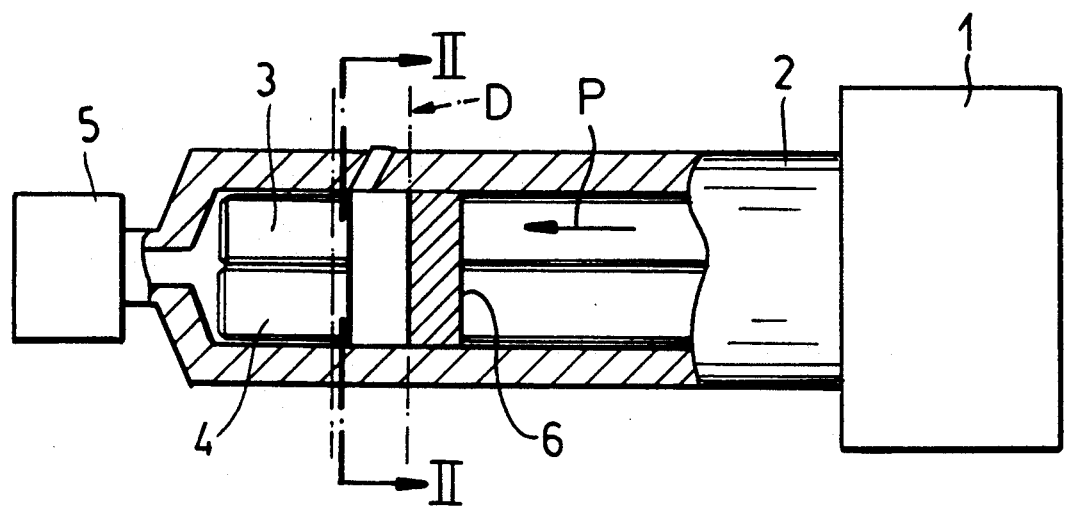
FIG. 1 is a plan view, broken away in axial cross section, diagrammatically illustrating the apparatus of the invention.

FIG. 1 shows an extruder 1 in highly schematic form. This extruder comprises a screw housing 2 with two screws 3 and 4 and thus is a double worm or double-screw extruder or compounder as this term is used in the art. The screws 3 and 4 can be rotated in the same sense or in opposite senses and have their helical flights or ribs meshing with one another. Only the elements important for the present invention have been shown.

Figure 3:
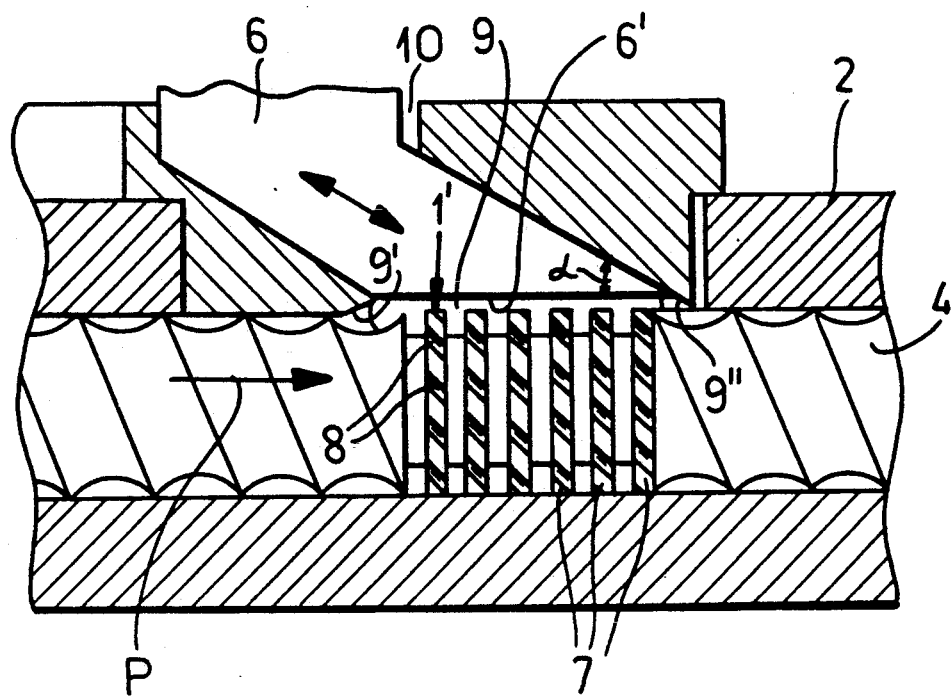
FIG. 3 is a detail axial section through the apparatus of FIGS. 1 and 2 showing the upper solid plate only and illustrating it in its upper end position.

In FIGS. 1 and 3, the arrows P represent the direction in which the synthetic resin melt moves toward an injection head 5 at which the melt can be injection molded.

The details of the construction of the screws 3 and 4 with their conveyor and mixing parts are not illustrated and to that extent the screws can be conventional.

Figure 2:
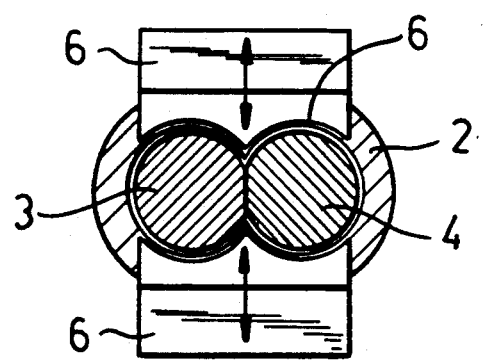
FIG. 2 is a cross sectional view taken along the line II—II of FIG. 1 but drawn to a larger scale.

Along the path of the melt along the screws, the melt passes through a throttle region D delineated between dot-dash lines in FIG. 1. This throttle region is shown in cross section in FIG. 2. From FIGS. 3 and 4 it will be apparent that in the throttle region 1' slide plates or sliders 6 are provided diametrically opposite one another on opposite sides of the screws 3 and 4 and cooperate with the screws 3 and 4 to throttle the flow of the plastic in the throttle region. More than two such slides can be provided and the slides can be distributed all around the periphery of the housing 2 and around the screws 3 and 4.

Figure 4:
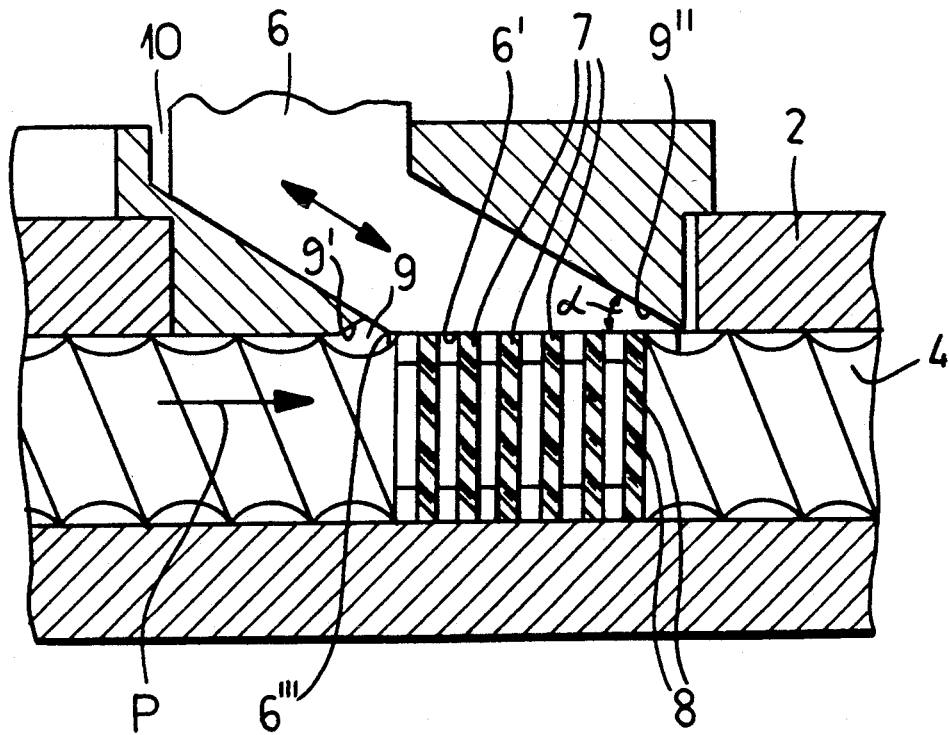
FIG. 4 is a view similar to FIG. 3 showing the solid plate in its other extreme position.

FIGS. 3 and 4 show a single slider 6 cooperating with screws and in these Figures only the screw 4 is visible. The screw 3 lies behind the screw 4 and thus beneath the plane of the drawing shown.

In the throttle region, the screws 3 and 4 are provided with axially-spaced throttle disks 7 whose outer diameters correspond to the inner diameter of the chambers of the housing 2 in which the screws are received. The throttle disks are formed with recesses in their peripheries extending the full radial width of the disk and forming a sawtooth peripheral configuration for the disks. The recesses 8 can be oriented axially or they can be inclined to the axis of the worm or screw 4 as has been shown in FIGS. 3 and 4. Upon rotation of the screws 3 and 4, the plastified melt is forced through the recesses 8.

In the region of the throttle disks 7 and thus in the throttle region D, radially outwardly-directed chambers 9, which also can be referred to as enlargements, are provided, these chambers widening inwardly and communicating with openings 10 of the housing 2. In these openings, the slide plates 6 are shiftable as represented by the double-headed arrows in FIGS. 3 and 4. Each plate 6 can thus be shifted between end positions of which one is illustrated in FIG. 3 and the other in FIG. 4.

The slide plates or sliders 6 are inclined in the housing 2 at an acute angle α to the axes of the screws. In FIGS. 3 and 4, the angle is shown to widen opposite the direction of flow or transport of the melt represented by the arrow P. The angle α can also open in the opposite direction. In either case the angle α should be between 30° and 80°.

The edge or surface 6' of the slide 6 extends parallel to the axis of the screws 4. In one end position, this surface lies at the outer limit of the chamber 9 while in the other end position it lies at its inner boundary. This inner boundary can correspond to the envelope of the screw compartment. Any selected position between these end or limiting positions is possible.

The chamber 9 has a trapezoidal cross section as taken in axial planes. The two flanks 9' and 9" (FIGS. 3 and 4) of the trapezoidal are inclined in opposite directions outwardly. This is most clear from FIG. 3.

The melt displaced by the screws, e.g. the screw 4, can thus flow into the chamber 9 without encountering undercuts or projections and can pass along the edge or surface 6' bounding this chamber. In a preferred embodiment, the chamber of enlargement 9 has the shape of an isosceles trapezoid and the two flanks 9', 9" extend at the same angles with respect to the two parallel sides of the enlargement 9.

With the relatively large flow cross section as shown in FIG. 3, the flow is unaffected by the fully-retracted slider 6. In the other end position according to FIG. 4, however, there is a reduction in the flow cross section and the material is forced to flow through the recesses 8 of the throttle disks 7. Since in this second end position the edge 6'" of the slide 6 is also inclined, it cannot generate a detrimental dead zone in the flow of the melt.

I claim:

1. A plastifying apparatus for plastics, said apparatus comprising:
an elongated extruder housing;
a pair of meshing extruder screws rotatable in said housing in respective generally cylindrical screw-receiving chambers formed therein with annular peripheral walls in said chambers to advance plastic material to be plastified in a path along said screws through said housing; and
means forming a steplessly variable throttle for said plastic material along said path, said means forming said throttle including:
at least two slide plates guided toward and away from said screws in respective openings through said housing for movement in a direction inclined at an acute angle to axes of said screws,
each of said slide plates having a linearly extending surface turned toward said screws and generally parallel to said axes, and
respective compartments formed in said respective openings adjacent said screws said compartments widening toward the screws and having a trapezoidal axial cross section with mutually parallel long sides parallel to said axes,
said slide plates having a displacement between retracted and extended extreme positions equal substantially to a distance between the long sides of the respective trapezoidal cross section whereby the linearly extending surface is displaceable between the long sides of the respective compartments, said linearly extending surface being flush with said walls in said extended extreme position.

2. The apparatus defined in claim 1 wherein a pair of said plates are provided at diametrically opposite sides of said screw and are slidable in said housing and provided with respective compartments.

3. The apparatus defined in claim 2 wherein said compartments have axial cross sections of the shape of an isosceles trapezoid.

4. The apparatus defined in claim 3 wherein said angle opens in a direction of flow of said material through said housing.

5. The apparatus defined in claim 3 wherein said angle opens in a direction opposite a flow of said material through said housing.

6. The apparatus defined in claim 3 wherein said acute angle is between 30° and 80°.

7. The apparatus defined in claim 1 wherein said throttle means is provided with pluralities of axially spaced throttle disks formed on the screws, said pluralities of the disks extending perpendicular to axes of said screws and being axially spaced apart therealong, said disks being formed with angularly equispaced peripheral recesses.

8. The apparatus defined in claim 7 wherein said compartments have in axial cross section the configuration of an isosceles trapezoid.

9. The apparatus defined in claim 1 wherein said angle opens in a direction opposite a direction of flow of said material through said housing.

10. The apparatus defined in claim 1 wherein said angle opens in a direction of flow of said material through said housing.

11. The apparatus defined in claim 1 wherein said angle is 30° to 80°.

* * * * *